US012761492B2

(12) United States Patent
Karvonen

(10) Patent No.: US 12,761,492 B2
(45) Date of Patent: Oct. 13, 2026

(54) DIFFRACTIVE DISPLAY SYSTEM WITH ADJUSTABLE IPD

(71) Applicant: Microsoft Technology Licensing, LLC, Redmond, WA (US)

(72) Inventor: Lasse Pekka Karvonen, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 18/674,336

(22) Filed: May 24, 2024

(65) Prior Publication Data

US 2025/0362518 A1 Nov. 27, 2025

(51) Int. Cl.

*G02B 27/09* (2006.01)
*G02B 6/293* (2006.01)
*G02B 27/01* (2006.01)

(52) U.S. Cl.

CPC ..... *G02B 27/0944* (2013.01); *G02B 6/29304* (2013.01); *G02B 27/0172* (2013.01)

(58) Field of Classification Search

CPC ............ G02B 27/0944; G02B 6/29304; G02B 27/0172; G02B 5/18; G02B 5/1814; G02B 5/1819; G02B 5/1842; G02B 5/1861; G02B 6/0011; G02B 6/0075; G02B 6/0076; G02B 6/2931; G02B 27/42; G02B 27/4205; G02B 27/4272; G02B 27/44; G02B 27/01; G02B 27/0101; G02B 27/017

USPC ................. 359/566, 13, 558, 569, 572, 576; 385/129

See application file for complete search history.

(56) References Cited

U.S. PATENT DOCUMENTS

2014/0140653 A1* 5/2014 Brown ................. G02B 6/0033 385/10
2023/0324687 A1* 10/2023 Mills .................. G02B 27/0172 359/630

* cited by examiner

*Primary Examiner* — Arnel C Lavarias
(74) *Attorney, Agent, or Firm* — Workman Nydegger

(57) ABSTRACT

A display system may include a waveguide plate comprising opposing parallel surfaces, an in-coupling grating, an expansion grating, and an out-coupling grating. The display system may include a projection system configured to direct input light toward the in-coupling grating and a translation assembly configured to translate the waveguide plate relative to the projection system along an axis. The in-coupling grating may be configured to diffract the input light to cause total internal reflection of the input light within the waveguide plate. The expansion grating may be configured to (i) cause replica expansion of the input light and (ii) cause the input light to propagate within the waveguide plate toward the out-coupling grating. The out-coupling grating may be configured to (i) cause replica expansion of the input light replica expanded by the expansion grating and (ii) diffract the input light replica expanded by the expansion grating outward from the waveguide plate.

20 Claims, 9 Drawing Sheets

400

400

DIFFRACTIVE DISPLAY SYSTEM WITH ADJUSTABLE IPD

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

AR systems often include diffractive display systems, which comprise transparent display elements through which light for forming images is projected for viewing by an end user. Many diffractive display systems include separate display elements for displaying images to separate eyes of the user. To create a realistic immersive experience, the image output displayed by the separate display elements is synchronized and spatially aligned.

A diffractive display system may comprise a set of transparent plates (e.g., glass, plastic, or other transparent plates) and a light projection system (e.g., including one or more light sources and one or more microelectromechanical system mirrors) that projects light toward the set of transparent plates. The set of transparent plates may receive and expand the input light in multiple dimensions, providing an expanded eyebox or pupil (i.e., the area of the set of transparent plates over which users can see AR content clearly and in full). Providing an expanded eyebox or pupil can allow an AR system to accommodate users with different eye positions or interpupillary distance (IPD).

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
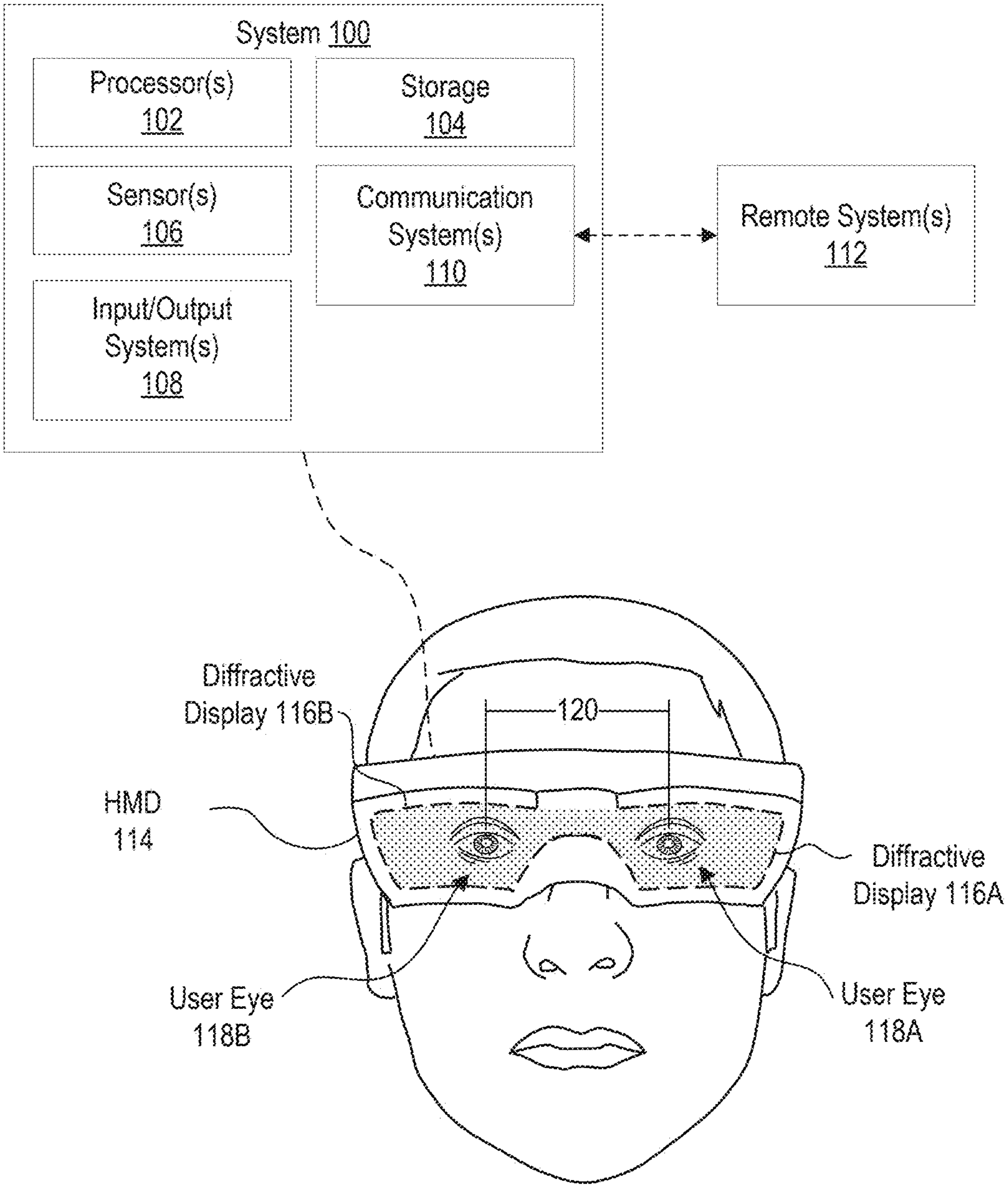
FIG. 1 illustrates example components of an example system that may include or be used to implement one or more disclosed embodiments.

Disclosed embodiments are generally directed to diffractive display systems that are adjustable to accommodate different IPDs. Although the present disclosure focuses, in at least some respects, on diffractive display systems and/or augmented reality (AR) systems, one will appreciate, in view of the present disclosure, that the principles disclosed herein are not limited to such implementations and may be applied to other fields of endeavor (e.g., other types of gratings and/or display devices).

Examples of Technical Benefits, Improvements, and Practical Applications

Those skilled in the art will recognize, in view of the present disclosure, that at least some of the disclosed embodiments may be implemented to address various shortcomings associated with conventional diffractive display systems. The following section outlines some example improvements and/or practical applications provided by the disclosed embodiments. It will be appreciated, however, that the following are examples only and that the embodiments described herein are in no way limited to the example improvements discussed herein.

As noted above, AR systems often utilize diffractive display systems, which include one or more sets of transparent plates and one or more light projection systems that project light toward the set(s) of transparent plate. The set(s) of transparent plates may be configured to out-couple an expanded eyebox or pupil to allow the AR system to accommodate users with different eye positions or IPDs. Conventional diffractive display systems provide an expanded eyebox or pupil sized to accommodate the IPDs of most users (e.g., with an expanded eyebox size of about 18 mm, within a range of about 53 to about 71 mm, or other sizes). The light projection system is typically configured to output sufficient light power to facilitate a full AR experience that is perceptible from any point on the expanded eyebox. However, for any given user (with a given IPD) operating an AR system, only a subset of the area of the expanded eyebox is needed to give the user a full AR experience, meaning that the light power expended to replicate the AR experience at other portions of the expanded eyebox is essentially wasted. This wasted expenditure of light power can result in reduced battery life, excess heat generation, and/or other problems that negatively affect AR experiences for users.

At least some disclosed embodiments are directed to a diffractive display system that facilitates translational movement of its waveguide plate(s) relative to its light projection system. For instance, the light projection system may remain at a fixed position relative to an overall device (e.g., an AR system), whereas the waveguide plate(s) may be translatable relative to the light projection system and the overall device. Translating the waveguide plate(s) relative to the light projection system can achieve a generally periscopic configuration in which the light out-coupling angles are robust against lateral, tilt, or wrap movements compared to the light source. This in contrast to an approach in which the light projection system and the waveguide plate(s) would be translated or moved together, where maintaining aligned left and right eye field-of-view angles would be highly challenging.

The translational movement of the waveguide plate(s) relative to the light projection system can enable repositioning of the expanded eyebox of the waveguide plate(s) to accommodate different IPDs and therefore different users. The positional adjustability of the waveguide plate(s) to accommodate different IPDs can allow the overall size of the expanded eyebox of the waveguide plate(s) to be reduced (e.g., relative to conventional diffractive displays). For example, the expanded eyebox of the waveguide plate(s) of a diffractive display system of the present disclosure may be about 10 mm, within a range of about 57 to 67 mm, or other sizes. This reduction in the size of the expanded eyebox can allow the light projection system of the disclosed diffractive display systems to operate with reduced light power while still providing a full AR experience over the relevant eyebox region. The reduced light power expended by the light projection to provide AR experiences can facilitate improved power efficiency, extended battery life, reduced heat, and/or other benefits.

Having just described some of the various high-level features and benefits of the disclosed embodiments, attention will now be directed to the Figures, which illustrate various conceptual representations, architectures, methods, and supporting illustrations related to the disclosed embodiments.

Example Systems and Techniques for Facilitating Alignment Control of Image Output Attention is now directed to FIG. 1, which illustrates an example system 100 that may include or be used to implement one or more disclosed embodiments. FIG. 1 depicts the system 100 as a head-mounted display 114 (HMD 114) configured for placement over a head of a user to display virtual content for viewing by the user's eyes 118A and 118B. Such an HMD 114 may comprise an augmented reality (AR) system, a virtual reality (VR) system, and/or any other type of HMD. Although the present disclosure focuses, in at least some respects, on a system 100 implemented as an HMD 114 for providing AR experiences, it should be noted that the techniques described herein may be implemented using other types of systems/devices, without limitation.

FIG. 1 illustrates various example components of the system 100. For example, FIG. 1 illustrates an implementation in which the system includes processor(s) 102, storage 104, sensor(s) 106, I/O system(s) 108, and communication system(s) 110. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise one or more computer-readable recording media or physical system memory and may be volatile, non-volatile, or some combination thereof. Furthermore, storage 104 may comprise local storage, remote storage (e.g., accessible via communication system(s) 110 or otherwise), or some combination thereof. Additional details related to processors (e.g., processor(s) 102) and computer storage media (e.g., storage 104) will be provided hereinafter.

As will be described in more detail, the processor(s) 102 may be configured to execute instructions stored within storage 104 to perform certain actions. In some instances, the actions may rely at least in part on communication system(s) 110 for receiving data from remote system(s) 112, which may include, for example, separate systems or computing devices, sensors, and/or others. The communications system(s) 110 may comprise any combination of software or hardware components that are operable to facilitate communication between on-system components/devices and/or with off-system components/devices. For example, the communications system(s) 110 may comprise ports, buses, or other physical connection apparatuses for communicating with other devices/components. Additionally, or alternatively, the communications system(s) 110 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 106. Sensor(s) 106 may comprise any device for capturing or measuring data representative of perceivable phenomenon. By way of non-limiting example, the sensor(s) 106 may comprise one or more image sensors, microphones, thermometers, barometers, magnetometers, accelerometers, gyroscopes, eye tracking systems, and/or others.

Furthermore, FIG. 1 illustrates that a system 100 may comprise or be in communication with I/O system(s) 108. I/O system(s) 108 may include any type of input or output device such as, by way of non-limiting example, a touch screen, a mouse, a keyboard, a controller, and/or others, without limitation. For example, the I/O system(s) 108 may include a display system that may comprise any number of display panels, optics, laser scanning display assemblies, and/or other components.

For instance, the I/O system(s) 108 of the system 100 (e.g., implemented as an HMD 114) may comprise diffractive displays 116A and 116B configured for displaying image for viewing by eyes of a user (e.g., user eyes 118A and 118B, respectively). The diffractive displays 116A and 116B may each comprise one or more glass plates that include diffractive optical elements (DOEs) disposed thereon. The diffractive displays 116A and 116B may comprise surface relief gratings (SRGs) disposed on glass plates, though other types of gratings and/or waveguide plates are within the scope of the present disclosure.

The diffractive displays 116A and 116B may be configured to receive light from light projection systems (e.g., microelectromechanical projectors), where the light depicts an image for viewing by the eyes 118A and 118B of the user. The diffractive displays 116A and 116B may expand the eyebox or pupil of light output by the light projection systems to allow the user's eyes 118A and 118B to view the image content at any portion of an eyebox region of the diffractive displays 116A and 116B, thereby allowing the HMD 114 to present AR virtual content to different users with different IPDs. A diffractive display with its accompanying light projection system may be regarded as a diffractive display system. A diffractive display system may include additional components, such as a translation assembly for facilitating translational movement of the diffractive display relative to the light projection system.

As noted above, the diffractive displays 116A and 116B may each comprise one or more respective waveguide plates for facilitating their image displaying functions. For illustrative/explanatory purposes, FIGS. 2A-3B depict example components of such waveguide plates. One will appreciate, in view of the present disclosure, that the particular shapes/forms/configurations of the components of FIGS. 2A-3B are provided by way of conceptual example only and are not intended to limit the scope of the present disclosure. After describing general components/features that may be included in waveguide plates of a diffractive display system, the discussion will turn to a diffractive display system in which the waveguide plate(s) is/are translatable relative to the light projection system, with reference to FIGS. 4A and 4B.

Figure 2A:
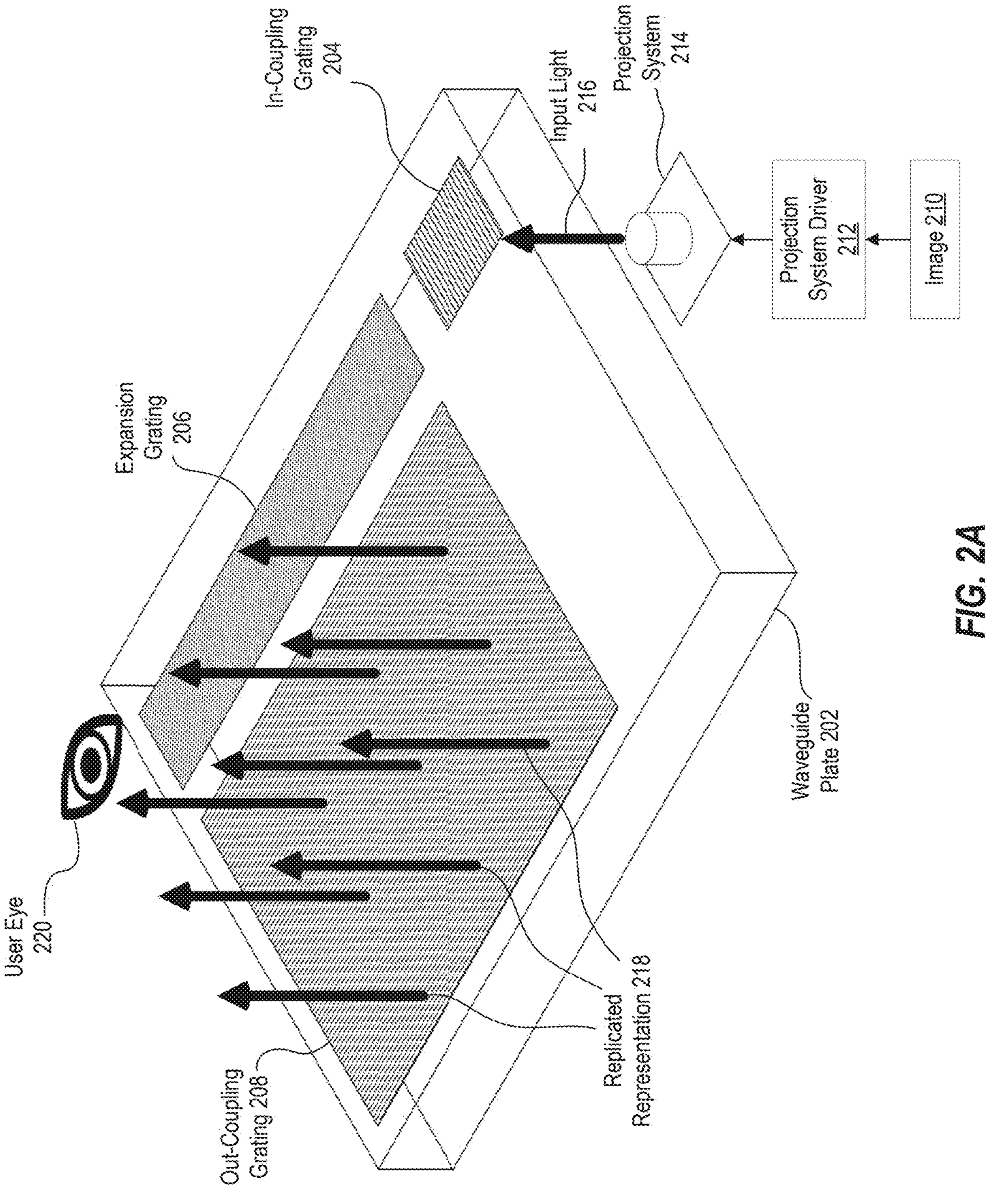
FIGS. 2A through 2D illustrate various views of a schematic representation of example components of a waveguide plate.

FIG. 2A depicts a waveguide plate 202, which may form at least a part of a diffractive display (e.g., diffractive displays 116A, 116B). FIG. 2A shows that a waveguide plate 202 may comprise various gratings, such as an in-coupling grating 204, an expansion grating 206, and an out-coupling grating 208. The in-coupling grating 204 may be configured to receive input light 216 and diffract the input light 216 for propagation within the waveguide plate 202. The input light 216 may be generated by a projection system 214 (e.g., a microelectromechanical projector and/or laser and mirror system; a microdisplay panel (reflective or transmissive) illuminated by a laser, LED, or other light source with optics for panel illumination and for projection of the panel image, etc.) driven by a projection system driver 212. The projection system driver 212 may drive the projection system 214 in accordance with image input (e.g., image 210 of FIG. 2A) to cause the input light 216 generated by the projection system 214 to depict or represent the image 210.

After diffraction by the in-coupling grating 204, the input light 216 is further diffracted by the expansion grating 206 and the out-coupling grating 208. The out-coupling grating 208 may diffract a replicated representation 218 of at least a portion of the image 210 outward from the waveguide plate 202 for viewing by an eye of a user 220. Diffraction of the input light 216 through the various gratings of the waveguide plate 202 causes replica expansion of the input light 216 which may cause the image pixels forming the image 210 to be visible through multiple locations (i.e., the expanded eyebox) on the out-coupling grating 208 (e.g., with the image appearing to be at an infinite distance and observable across a range of different eye positions).

Figure 2B:
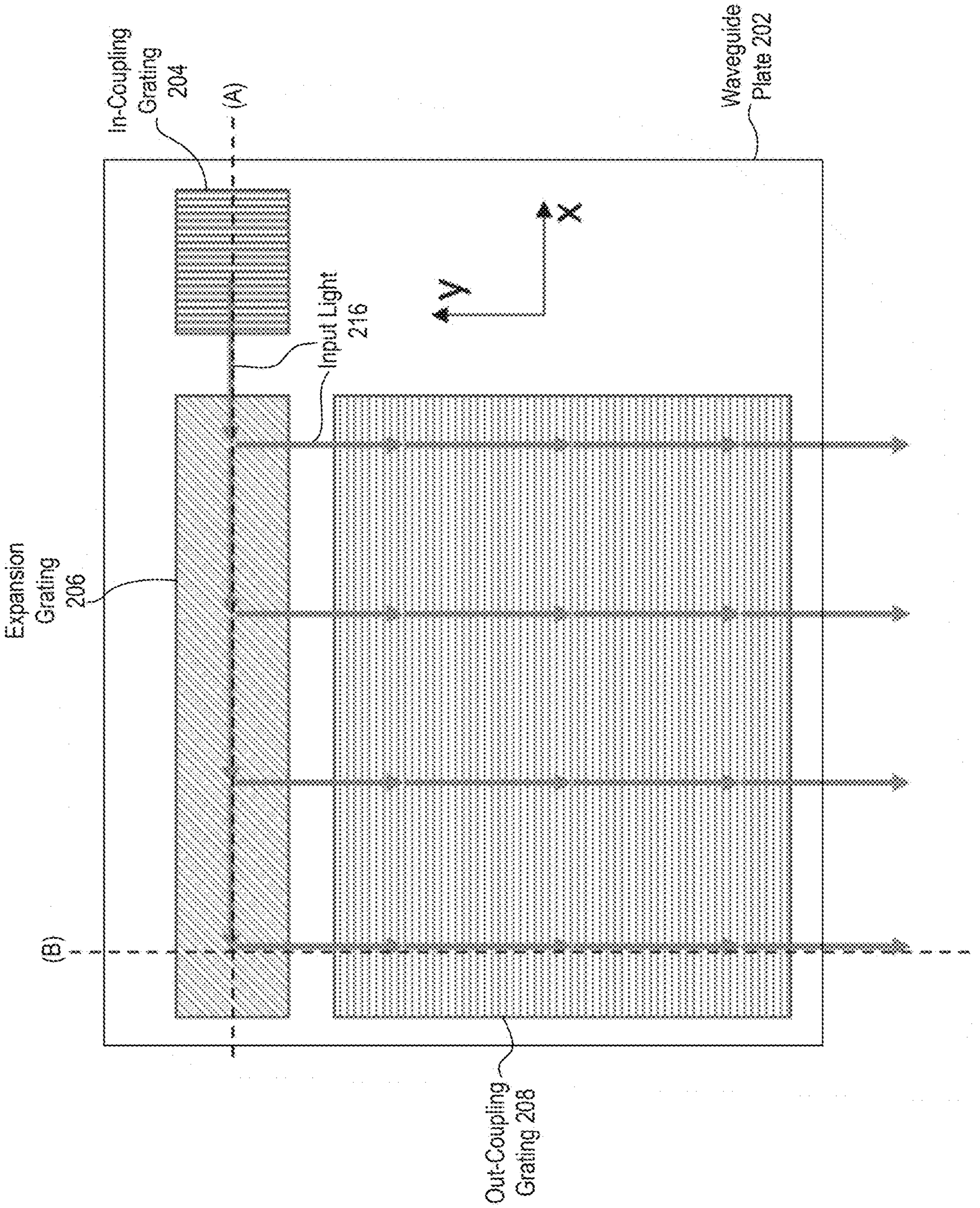
Figure 2C:
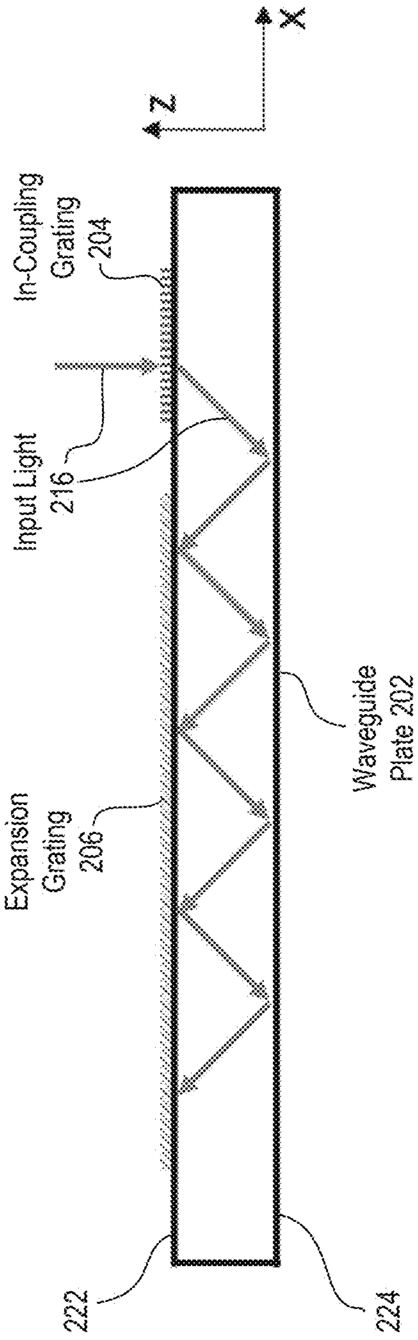
Figure 2D:
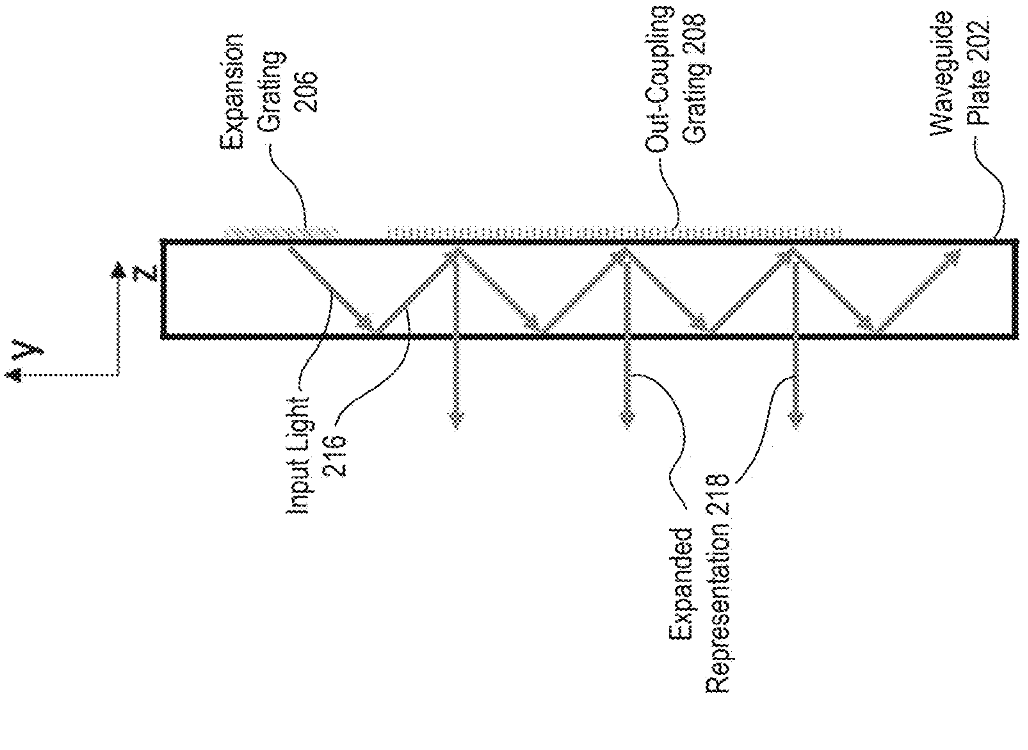

FIGS. 2B, 2C, and 2D provide additional depictions of propagation of the input light 216 through the waveguide plate 202. For instance, FIG. 2B shows a top view of the waveguide plate 202, FIG. 2C shows a front sectional view of the waveguide plate 202 (sectioned along dashed line (A) shown in FIG. 2B), and FIG. 2D shows a side sectional view of the waveguide plate 202 (sectioned along dashed line (B) shown in FIG. 2B). Relevant x, y, and z-axes are illustrated in FIGS. 2B through 2D for clarity.

FIG. 2B shows the input light 216 diffracted from the in-coupling grating 204 toward the expansion grating 206 of the waveguide plate 202. FIG. 2C furthermore shows that the in-coupling grating 204 diffracts the input light 216 in a manner that causes total internal reflection of the input light 216 within the waveguide plate 202 (e.g., between opposing parallel surfaces 222 and 224 of the waveguide plate 202). The input light 216 propagates to various portions of the expansion grating 206. The expansion grating 206 thus allows the input light 216 to replicate or expand in one direction/dimension (e.g., along the length of the expansion grating 206).

As shown in FIG. 2D, the expansion grating 206 diffracts the input light 216 in a manner that causes the input light 216 to propagate within the waveguide plate 202 (e.g., via total internal reflection) toward various portions of the out-coupling grating 208, allowing the input light to further replicate or expand in another direction/dimension (e.g., along the length of the out-coupling grating 208). In this regard, the out-coupling grating 208 may also facilitate replica expansion of the input light 216 within the waveguide plate 202.

The out-coupling grating 208 is configured to diffract the input light 216 outward from the waveguide plate 202, shown in FIG. 2D by the replicated representation 218 diffracting outward from the waveguide plate 202. As noted above, the replicated representation 218 may be viewed by an eye of a user from various viewing angles.

While FIGS. 2A through 2D illustrate propagation of a single beam of input light through the waveguide plate 202 (e.g., forming a pixel of an image), multiple beams of input light may propagate through the waveguide plate 202 (e.g., being projected toward the in-coupling grating 204 with different incident angles) to form a representation of an image (e.g., to form multiple pixels of an input image, such as image 210 of FIG. 2A).

Furthermore, in some instances, multiple waveguide plates are utilized to form a representation of an input image. For example, FIGS. 3A and 3B illustrate various views of a waveguide stack 300 that includes a plurality of waveguide plates 302A, 302B, and 302C usable to facilitate replica expansion for a projection of input light 310 representing an image for viewing by a user.

Figure 3A:
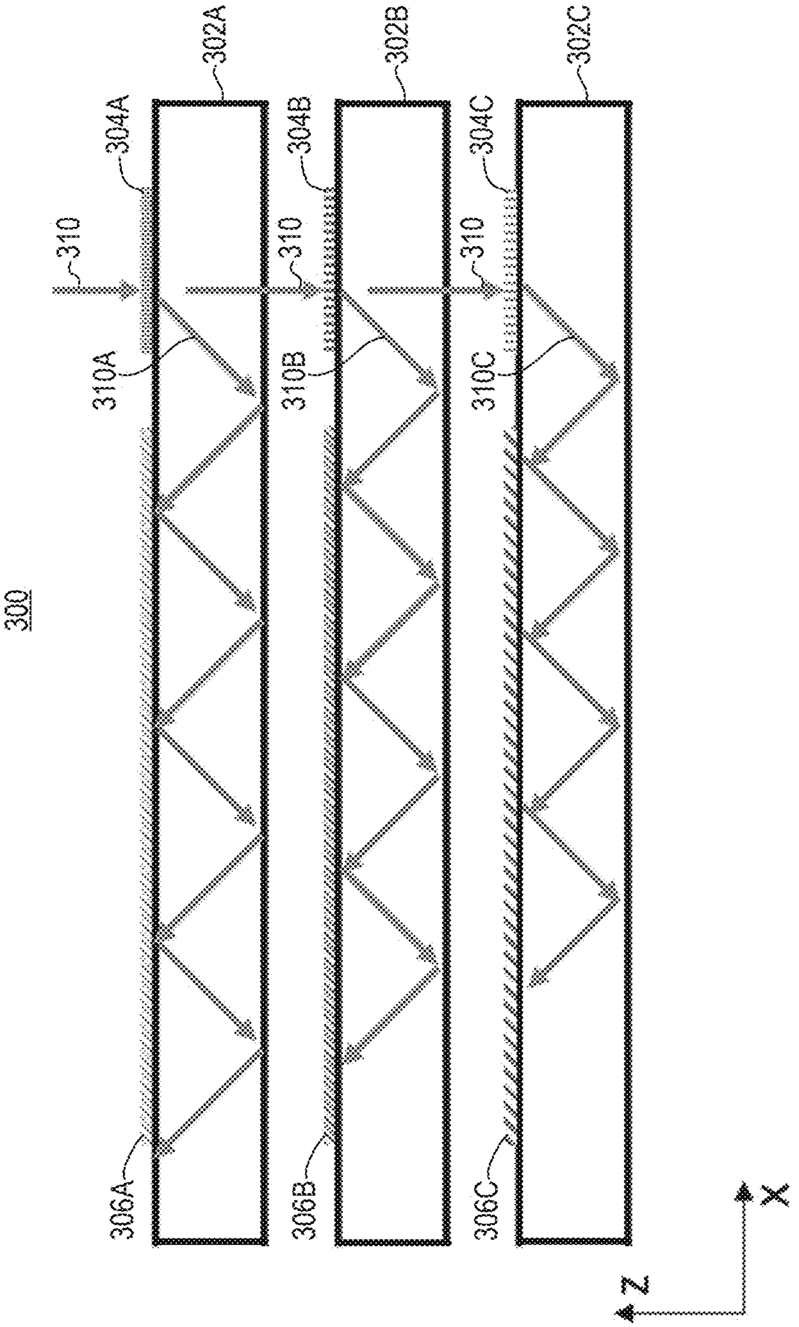
FIGS. 3A and 3B illustrate various views of a schematic representation of example components of a waveguide stack.
Figure 3B:
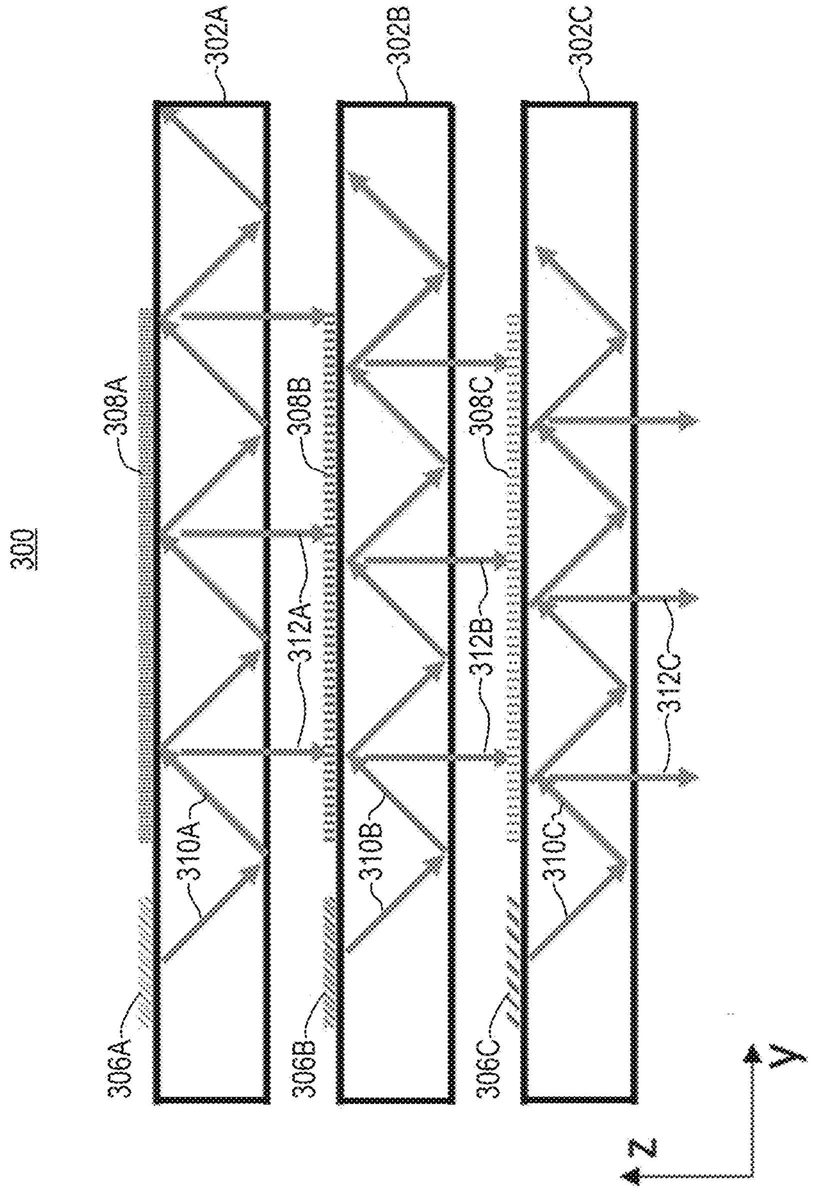

As shown in FIGS. 3A and 3B, each of the waveguide plates 302A, 302B, and 302C includes a respective in-coupling grating 304A, 304B, and 304C, a respective expansion grating 306A, 306B, and 306B, and a respective out-coupling grating 308A, 308B, and 308C. As shown in FIG. 3A, different portions of the input light 310 are in-coupled by the different in-coupling gratings 304A, 304B, and 304C. For instance, portion 310A of the input light 310 is in-coupled by in-coupling grating 304A for propagation through waveguide plate 302A toward expansion grating 306A. Similarly, portion 310B of the input light 310 is in-coupled by in-coupling grating 304B for propagation through waveguide plate 302B toward expansion grating 306B. Furthermore, portion 310C of the input light 310 is in-coupled by in-coupling grating 304C for propagation through waveguide plate 302C toward expansion grating 306C. The different portions 310A, 310B, and 310C of the input light may correspond to different color channels (e.g., red, green, blue) and/or different image regions.

As shown in FIG. 3B, expansion grating 306A diffracts portion 310A of the input light 310 toward out-coupling grating 308A to cause out-coupling of replicated representation 312A. Similarly, expansion grating 306B diffracts portion 310B of the input light 310 toward out-coupling grating 308B to cause out-coupling of replicated representation 312B. Furthermore, expansion grating 306C diffracts portion 310C of the input light 310 toward out-coupling grating 308C to cause out-coupling of replicated representation 312C. The different expanded portions 312A, 312B, and 312C may be viewed simultaneously by a user and perceived as a depiction of an input image.

In some implementations, a waveguide plate (or waveguide stack) may be utilized in combination with another waveguide plate (or waveguide stack) to provide users with binocular representations of input imagery (e.g., see HMD 114 of FIG. 1, with different diffractive displays 116A and 116B for presentation to different user eyes 118A and 118B).

Figure 4A:
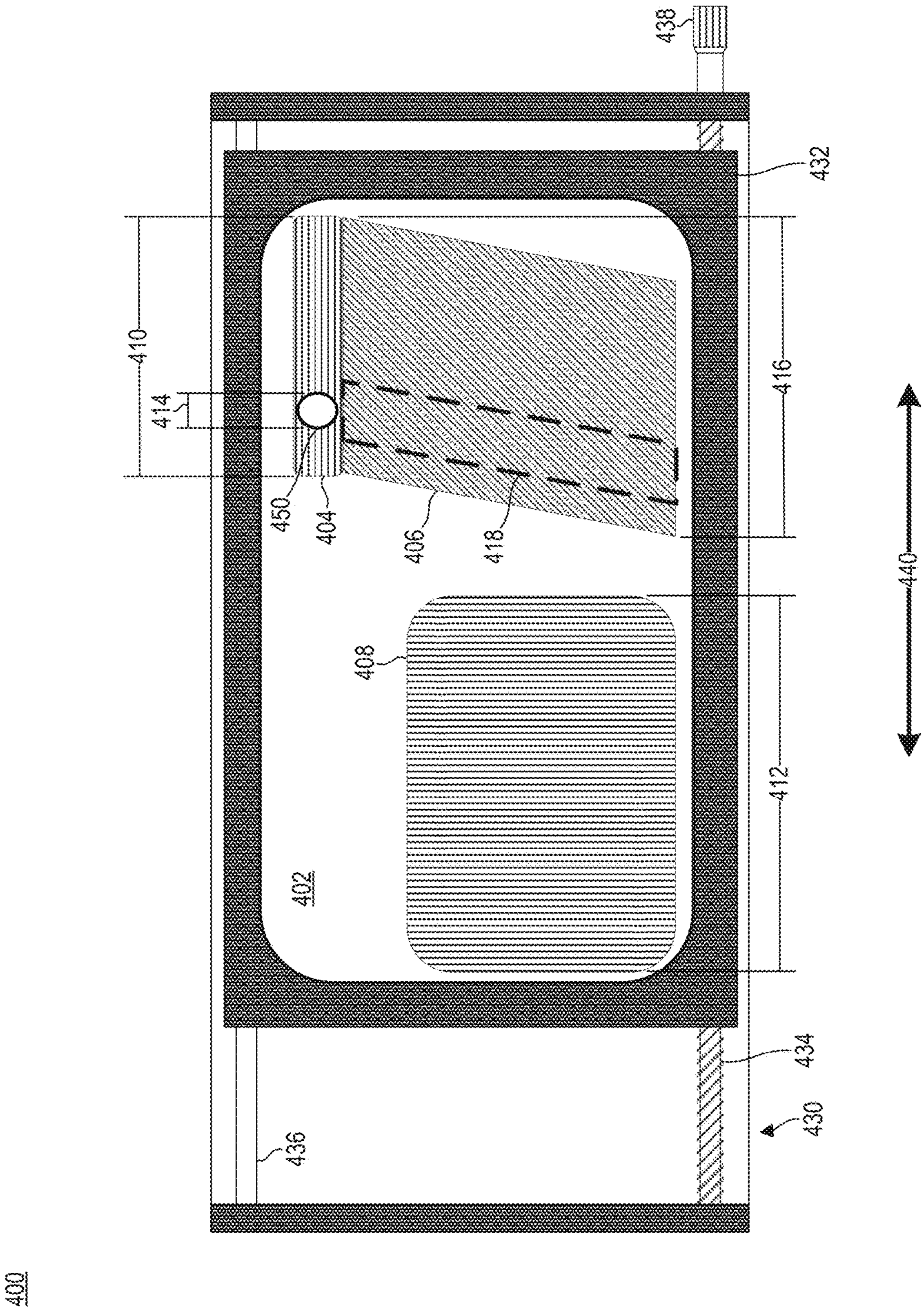
FIGS. 4A and 4B illustrate schematic representations of an example display system that includes a waveguide plate and a translation assembly, in accordance with implementations of the present disclosure.
Figure 4B:
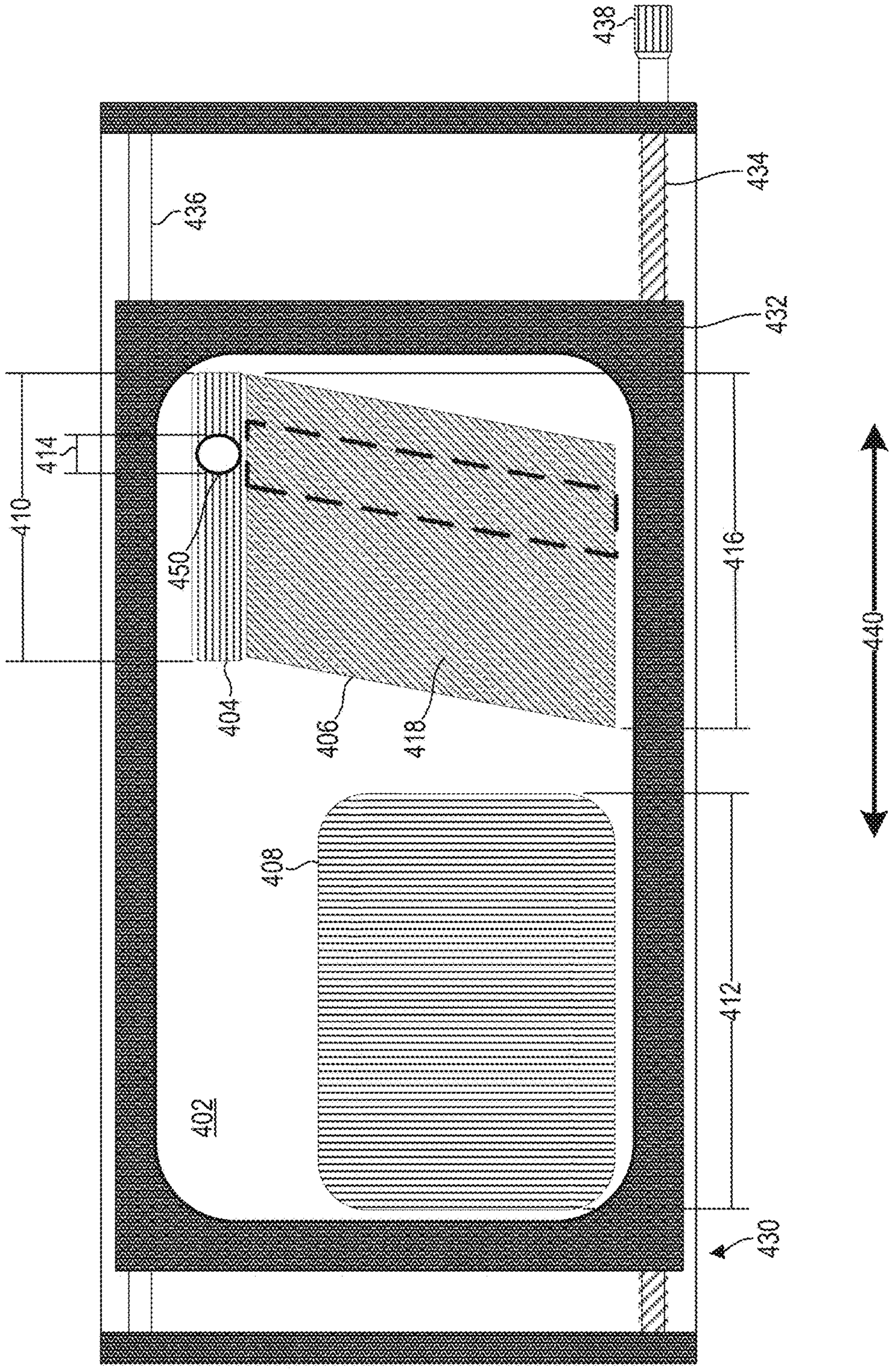

FIGS. 4A and 4B illustrate schematic representations of an example display system 400 that includes a waveguide plate 402, a translation assembly 430, and a projection system 450, in accordance with implementations of the present disclosure. The waveguide plate 402 shown in FIGS. 4A and 4B conceptually corresponds to the waveguide plate 202 described hereinabove with reference to FIGS. 2A through 2D. For instance, the waveguide plate 402 include opposing parallel surfaces (e.g., conceptually similar to parallel surfaces 222 and 224), an in-coupling grating 404 (e.g., conceptually similar to in-coupling grating 204), an expansion grating 406 (e.g., conceptually similar to expansion grating 206), and an out-coupling grating 408 (e.g., conceptually similar to out-coupling grating 208). The gratings of the waveguide plate 402 may comprise SRGs or other types of gratings.

The projection system 450 conceptually corresponds to the projection system 214 discussed hereinabove. For instance, the projection system 450 can be configured to direct input light toward the in-coupling grating 404. For clarity of illustration, the projection system 450 is depicted in FIG. 4A by an oval representing the input light (i.e., the pupil) generated by the projection system 450 that is incident on the in-coupling grating 404.

The in-coupling grating 404 can be configured to in-couple or diffract the input light incident thereon (and generated by the projection system 450) to cause total internal reflection of the input light within the waveguide plate 402 (e.g., via the opposing parallel surfaces of the waveguide plate 402). The expansion grating 406 can receive the in-coupled input light and can cause replica expansion thereof, while diffracting the input light toward the out-coupling grating 408. The out-coupling grating 408 can receive the replica expanded input light (e.g., after expansion and diffraction by the expansion grating 406) and further replica expand the received light (e.g., with different expansion direction characteristics). The 408 may also diffract the further replica expanded light outward from the waveguide plate 402.

The translation assembly 430 is configured to translate the waveguide plate 402 relative to the projection system 450 along an axis 440 (e.g., over a range of one or more millimeters, such as up to about 20 millimeters or less, about 15 millimeters or less, about 10 millimeters or less, about 5 millimeters or less, etc.). In the example shown in FIGS. 4A and 4B, the translation assembly 430 includes a translation stage 432 to which the waveguide plate 402 is mounted. As illustrated, the translation stage 432 is movable via a translation screw 434 with threads that engage with corresponding threads of the translation stage 432. FIGS. 4A and 4B illustrate the waveguide plate 402 at different translational positions achievable by manually rotating the translation screw 434 (e.g., via adjustment knob 438) to urge the translation stage 432 in different directions along the axis 440. The translation assembly 430 in the example shown also includes a guide rail 436 to maintain planar alignment of the translation stage 432 through different translational positions. One will appreciate, in view of the present disclosure, that the specific form of the translation assembly 430 shown in FIGS. 4A and 4B (i.e., a screw-driven translation stage) is provided by way of example only and that other forms are within the scope of the present disclosure. For instance, a translation assembly of a display system 400 may be implemented as a motorized translation stage or other actuation mechanism for moving the waveguide plate 402 along the axis 440. The motor for driving the translation stage 432 may be controlled by control circuitry of the underlying system (e.g., processor(s) 102 of the HMD 114) to bring the waveguide plate 402 to desired translational positions (e.g., to conform to different user IPDs, which may be entered by users, measured using sensor(s) 106 of the HMD 114, etc.).

As noted above, FIGS. 4A and 4B illustrate the waveguide plate 402 at different translational positions along the axis 440 (e.g., achieved via actuation of the translation assembly 430). The different translational positions cause the projection system 450 to align with and direct input light to different parts of the in-coupling grating 404. Along these lines, FIGS. 4A and 4B illustrate the in-coupling grating 404 as having an elongated shape in the horizontal direction (e.g., along the axis 440) (e.g., relative to the in-coupling grating 204 shown and described hereinabove). The elongated shape of the in-coupling grating 404 can enable the in-coupling grating 404 to receive the input light from the projection system 450 at (each) different translational positions of the waveguide plate 402 relative to the projection system 450. In some instances, the length 410 of the in-coupling grating 404 and the length 412 of the out-coupling grating 408 are within about 50% of one another (or 45%, 40%, 35%, 30%, 25%, 20%, 15%, 10%, 5%, 0%, or any percent within a range having endpoints selected from among or between any of the foregoing values). As used herein, two distance measurements are within X percent of one another when the absolute difference between the two distances is equal to or less than X percent of the larger distance measurement.

The elongated shape of the in-coupling grating 404 can also result in a significant portion of the in-coupling grating 404 going unused during operation of the display system 400 to provide display imagery to a user while the waveguide plate 402 is arranged at a particular translational position relative to the projection system 450 (e.g., to accommodate a specific IPD of a user). In the example shown in FIGS. 4A and 4B, the input light incident on the in-coupling grating 404 from the projection system 450 (illustrated in FIGS. 4A and 4B by the reference numeral indicating the projection system 450) only covers a small portion of the in-coupling grating 404 (e.g., only a small portion of the area thereof). In this regard, in some implementations, the length 410 of the in-coupling grating 404 along the axis 440 may be greater than about 200% of the pupil length 414 (along the axis 440) of the input light input to the in-coupling grating 404 by the projection system 450 (or greater than about 300%, 400%, 500%, 600%, 700%, 800%, or any percent within a range having endpoints selected from among or between any of the foregoing values). Furthermore, in some instances, for any given translational position of the waveguide plate 402 relative to the projection system 450 along the axis 440, less than about 70% of the in-coupling grating 404 receives input light from the projection system 450 and in-couples the input light or diffracts the input light into the waveguide plate 402 for propagation via total internal reflection (or less than about 65%, 60%, 55%, 50%, 45%, 40%, 35%, 30%, 25%, 20%, 15%, 10%, 5% or any percent within a range having endpoints selected from among or between any of the foregoing values).

In the example shown in FIGS. 4A and 4B, the expansion grating 406 also comprises an elongated shape along the axis 440, which can enable the expansion grating 406 to receive, diffract, and expand the input light in-coupled by the in-coupling grating 404 at each of the available translational positions of the waveguide plate 402 relative to the projection system 450. In some instances, the length 416 (or 410) of the expansion grating 406 and the length 412 of the out-coupling grating 408 are within about 50% of one another (or 45%, 40%, 35%, 30%, 25%, 20%, 15%, 10%, 5%, 0%, or any percent within a range having endpoints selected from among or between any of the foregoing values).

Furthermore, similar to the in-coupling grating 404, the elongated shape of the expansion grating 406 can result in a significant portion of the expansion grating 406 going unused during operation of the display system 400 to provide display imagery to a user while the waveguide plate 402 is arranged at a particular translational position relative to the projection system 450 (e.g., to accommodate a specific IPD of a user). FIGS. 4A and 4B conceptually depict a region 418 of the expansion grating 406 that receives in-coupled input light from the in-coupling grating 404 for the corresponding translational configuration shown. In some instances, for a given translational configuration of the waveguide plate 402 relative to the projection system 450 along the axis 440, the region 418 of the expansion grating 406 that receives and replica expands in-coupled input light from the in-coupling grating 404 is less than 70% of the area of the expansion grating 406 (or less than about 65%, 60%, 55%, 50%, 45%, 40%, 35%, 30%, 25%, 20%, 15%, 10%, 5% or any percent within a range having endpoints selected from among or between any of the foregoing values). Stated differently, in some instances, for each translational configuration of the waveguide plate 402 relative to the projection system 450 along the axis 440, less than 70% of the expansion grating 406 causes replica expansion of the input light and causes the input light to propagate within the waveguide plate toward the out-coupling grating 408 (or less than about 65%, 60%, 55%, 50%, 45%, 40%, 35%, 30%, 25%, 20%, 15%, 10%, 5% or any percent within a range having endpoints selected from among or between any of the foregoing values).

When the display system 400 is implemented on a user system (e.g., an HMD 114), the axis 440 along which the translation assembly 430 translates the waveguide plate 402 can be substantially parallel to the IPD of the user (FIG. 1 illustrates an example IPD 120 of the eyes 118A and 118B of the user illustrated). In this way, the translation assembly 430 may be used to adjust the positioning of the waveguide plate 402 to cause the out-coupling grating 408 (especially the expanded eyebox or pupil of the out-coupling grating 408) to become aligned with a user's eye. A user system (e.g., HMD 114) can include a display system 400 for displaying content to each eye of the user (e.g., for displaying content to different eyes 118A and 118B of the user, with each of the display systems comprising mirrored waveguide plates, translation assemblies, projection systems, and/or other components). Each display system may be adjustable by its respective translation assembly to facilitate alignment of its respective waveguide plate with the corresponding eye of the user. In some instances, the translation assemblies of the different display systems are coupled such that user adjustment of one of the translation assemblies (e.g., via an adjustment knob 438 of one of the assemblies) causes translation of both of the waveguide plates. In some instances, an eye tracking system of the user system (e.g., an eye tracking system of HMD 114) may obtain eye tracking measurements to determine the IPD of the user's eyes (e.g., to determine IPD 120 of eyes 118A and 118B), and the HMD may utilize the determined IPD to automatically adjust the translation assemblies to achieve alignment of the expanded eyeboxes of the different waveguide plates with the user's eyes (e.g., where the translation assemblies are motor-controlled). Such user systems (e.g., HMD 114) can thus accommodate different IPDs for different users.

Although the examples discussed hereinbelow with reference to FIGS. 4A and 4B focus, in at least some respects, on a display system that utilizes a waveguide plate 402 in conjunction with a translation assembly 430 and a projection system 450, the principles described herein may be applied to provide a display system that utilize a waveguide stack (e.g., conceptually similar to waveguide stack 300) in conjunction with a translation assembly 430 and a projection system 450.

Additional Details Related to Implementing the Disclosed Embodiments

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A display system for accommodating different interpupillary distances (IPDs), the display system comprising:
- a waveguide plate comprising opposing parallel surfaces, the waveguide plate further comprising an in-coupling grating, an expansion grating, and an out-coupling grating;
- a projection system configured to direct input light toward the in-coupling grating; and
- a translation assembly configured to translate the waveguide plate relative to the projection system along an axis, wherein:
- the in-coupling grating is configured to diffract the input light to cause total internal reflection of the input light within the waveguide plate via the opposing parallel surfaces of the waveguide plate,
- the expansion grating is configured to (i) cause replica expansion of the input light and (ii) cause the input light to propagate within the waveguide plate toward the out-coupling grating, and
- the out-coupling grating is configured to (i) cause replica expansion of the input light replica expanded by the expansion grating and (ii) diffract the input light replica expanded by the expansion grating outward from the waveguide plate.

2. The display system of claim 1, wherein the in-coupling grating, the expansion grating, or the out-coupling grating comprises a surface relief grating (SRG).

3. The display system of claim 1, wherein lengths of the in-coupling grating and the out-coupling grating along the axis are within about 50% of one another.

4. The display system of claim 1, wherein a length of the in-coupling grating along the axis is greater than about 200% of a pupil length of the input light input to the in-coupling grating by the projection system.

5. The display system of claim 1, wherein lengths of the expansion grating and the out-coupling grating along the axis are within about 50% of one another.

6. The display system of claim 1, wherein the translation assembly comprises a screw-driven or motorized translation stage on which the waveguide plate is mounted.

7. The display system of claim 1, wherein, for each translational position of the waveguide plate relative to the projection system, less than about 70% of the in-coupling grating diffracts the input light to cause total internal reflection of the input light within the waveguide plate.

8. The display system of claim 1, wherein, for each translational position of the waveguide plate relative to the projection system, less than about 70% of the expansion grating causes replica expansion of the input light and causes the input light to propagate within the waveguide plate toward the out-coupling grating.

9. A display system for accommodating different interpupillary distances (IPDs), the display system comprising:

a waveguide plate comprising opposing parallel surfaces, the waveguide plate further comprising an in-coupling grating, an expansion grating, and an out-coupling grating;

wherein:

the in-coupling grating is configured to diffract input light received from a projection system to cause total internal reflection of the input light within the waveguide plate via the opposing parallel surfaces of the waveguide plate, the expansion grating is configured to (i) cause replica expansion of the input light and (ii) cause the input light to propagate within the waveguide plate toward the out-coupling grating, the out-coupling grating is configured to (i) cause replica expansion of the input light replica expanded by the expansion grating and (ii) diffract the input light replica expanded by the expansion grating outward from the waveguide plate, the in-coupling grating is configured to receive the input light from the projection system at a plurality of translational positions of the waveguide plate relative to the projection system, and for each translational position of the waveguide plate relative to the projection system, less than about 70% of the in-coupling grating diffracts the input light to cause internal reflection of the input light within the waveguide plate.

10. The display system of claim 9, wherein, for each translational position of the plurality of translational positions, less than about 70% of the expansion grating causes replica expansion of the input light and causes the input light to propagate within the waveguide plate toward the out-coupling grating.

11. The display system of claim 9, wherein the in-coupling grating, the expansion grating, or the out-coupling grating comprises a surface relief grating (SRG).

12. The display system of claim 9, further comprising a translation assembly on which the waveguide plate is mounted, the translation assembly being configured to translate the waveguide plate along an axis to achieve the plurality of translational positions of the waveguide plate relative to the projection system.

13. The display system of claim 12, wherein lengths of the in-coupling grating and the out-coupling grating along the axis are within about 50% of one another.

14. The display system of claim 12, wherein a length of the in-coupling grating along the axis is greater than about 200% of a pupil length of the input light input to the in-coupling grating by the projection system.

15. The display system of claim 12, wherein lengths of the expansion grating and the out-coupling grating along the axis are within about 50% of one another.

16. The display system of claim 12, wherein the translation assembly comprises a screw-driven or motorized translation stage on which the waveguide plate is mounted.

17. A head-mounted display (HMD) for accommodating different interpupillary distances (IPDs), the HMD comprising:

a first display system, the first display system comprising:

a first waveguide plate comprising first opposing parallel surfaces, the first waveguide plate further comprising a first in-coupling grating, a first expansion grating, and a first out-coupling grating;

a first projection system configured to direct first input light toward the first in-coupling grating; and a first translation assembly configured to translate the first waveguide plate relative to the first projection system along an axis, wherein:

the first in-coupling grating is configured to diffract the first input light to cause total internal reflection of the first input light within the first waveguide plate via the first opposing parallel surfaces of the first waveguide plate, the first expansion grating is configured to (i) cause replica expansion of the first input light and (ii) cause the first input light to propagate within the first waveguide plate toward the out-coupling grating, and the first out-coupling grating is configured to (i) cause replica expansion of the first input light replica expanded by the first expansion grating and (ii) diffract the first input light replica expanded by the first expansion grating outward from the first waveguide plate for viewing by a first eye of a user operating the HMD; and a second display system, the second display system comprising:

a second waveguide plate comprising second opposing parallel surfaces, the second waveguide plate further comprising a second in-coupling grating, a second expansion grating, and a second out-coupling grating;

a second projection system configured to direct second input light toward the second in-coupling grating; and a second translation assembly configured to translate the second waveguide plate relative to the second projection system along the axis, wherein:

the second in-coupling grating is configured to diffract the second input light to cause total internal reflection of the second input light within the second waveguide plate via the second opposing parallel surfaces of the second waveguide plate, the second expansion grating is configured to (i) cause replica expansion of the second input light and (ii) cause the second input light to propagate within the second waveguide plate toward the out-coupling grating, and the second out-coupling grating is configured to (i) cause replica expansion of the second input light replica expanded by the second expansion grating and (ii) diffract the second input light replica expanded by the second expansion grating outward from the second waveguide plate for viewing by a second eye of a user operating the HMD.

18. The HMD of claim 17, wherein the axis is substantially parallel to an IPD of the user operating the HMD.

19. The HMD of claim 17, wherein the first translation assembly or the second translation assembly comprises an adjustment knob to facilitate translation of the first waveguide plate or the second waveguide plate along the axis.

20. The HMD of claim 17, further comprising an eye tracking system configured to determine an IPD of the first eye and the second eye of the user, wherein the HMD is configured to automatically adjust the first translation assembly and the second translation assembly based on the IPD of the first eye and the second eye.

* * * * *